United States Patent
Lee et al.

(10) Patent No.: US 8,340,049 B2
(45) Date of Patent: Dec. 25, 2012

(54) MOBILE TERMINAL AND HANDOVER METHOD THEREOF

(75) Inventors: Jong Hoon Lee, Gyeonggi-do (KR); Sang Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 12/698,910

(22) Filed: Feb. 2, 2010

(65) Prior Publication Data
US 2010/0208699 A1    Aug. 19, 2010

(30) Foreign Application Priority Data
Feb. 16, 2009 (KR) ................ 10-2009-0012489

(51) Int. Cl.
*H04W 4/00* (2009.01)
(52) U.S. Cl. ........................................... 370/331
(58) Field of Classification Search ............... 370/331, 370/332, 335, 338, 341, 349, 352, 353, 310.2, 370/389, 471, 410, 400; 455/435.2, 552, 455/436
See application file for complete search history.

(56) References Cited

U.S. PATENT DOCUMENTS
2005/0227691 A1* 10/2005 Pecen et al. ............... 455/435.2
2008/0008127 A1    1/2008 Choi et al.

* cited by examiner

*Primary Examiner* — Chi Pham
*Assistant Examiner* — Alexander O Boakye
(74) *Attorney, Agent, or Firm* — Lee, Hong, Degerman, Kang & Waimey

(57) ABSTRACT

A method of performing handover of a mobile terminal includes performing a registration procedure by accessing a first network, storing registration information in the first network, and performing handover to a second network upon completion of the registration procedure in order to perform data communication by accessing the second network. The method also includes determining if handover from the second network back to the first network is necessary while the mobile terminal accesses the second network and performing the handover to the first network using the registration information stored in the first network if it is determined that handover from the second network back to the first network is necessary.

20 Claims, 9 Drawing Sheets

MOBILE TERMINAL AND HANDOVER METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0012489, filed on Feb. 16, 2009, the contents of which are hereby incorporated by reference herein in its entirety.

FIELD OF THE INVENTION

The present invention relates to a mobile terminal, and more particularly, to a mobile terminal and handover method thereof. Although the present invention is suitable for a wide scope of applications, it is particularly suitable for performing an inter-heterogeneous network handover function.

DISCUSSION OF THE RELATED ART

A mobile terminal is a device that may be configured to perform various functions. Examples of such functions include data and voice communications, capturing images and video via a camera, recording audio, playing music files via a speaker system, and displaying images and video on a display. Some terminals include additional functionality that supports game playing, while other terminals are configured as multimedia players. Mobile terminals have recently been configured to receive broadcast and multicast signals that permit viewing of content such as videos and television programs.

Efforts are ongoing to support and increase the functionality of mobile terminals. Such efforts include software and hardware improvements, as well as changes and improvements in the structural components that form the mobile terminal.

Generally, a mobile terminal capable of supporting a handover function is able to perform a handover to a second network if data communication sensitivity drops below a predetermined reference level during the course of data communication in a first network. However, according to the related art method or technology, if the first and second networks fail to share Internet protocol (IP) with each other, the IP needs to be reassigned by the second network to which a handover is performed. Therefore, data transmission/reception may not be smoothly operable. Moreover, if a handover is performed to a second network from a first network, a registration procedure needs to be performed in the second network. Therefore, it may cause data communication to be interrupted or delayed.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A mobile terminal includes a wireless communication unit and a controller. The wireless communication unit is configured to transmit and receive data via at least one network. The controller is configured to perform a registration procedure by accessing a first network of the at least one network and storing registration information in the first network. The controller is also configured to control the wireless communication unit to perform a handover to a second network of the at least one network upon completion of the registration procedure in order to perform data communication by accessing the second network. The controller is further configured to determine if a handover from the second network back to the first network is necessary while the mobile terminal accesses the second network. Additionally, the controller is configured to control the wireless communication unit to perform the handover to the first network using the registration information stored in the first network if the controller determines that a handover from the second network back to the first network is necessary.

A method of performing a handover of a mobile terminal includes performing a registration procedure via a controller by accessing a first network, storing registration information in the first network, performing a handover via a wireless communication unit to a second network upon completion of the registration procedure in order to perform data communication by accessing the second network, determining via the controller if a handover from the second network back to the first network is necessary while accessing the second network. and controlling the wireless communication unit via the controller to perform the handover to the first network using the registration information stored in the first network if it is determined that handover from the second network back to the first network is necessary.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
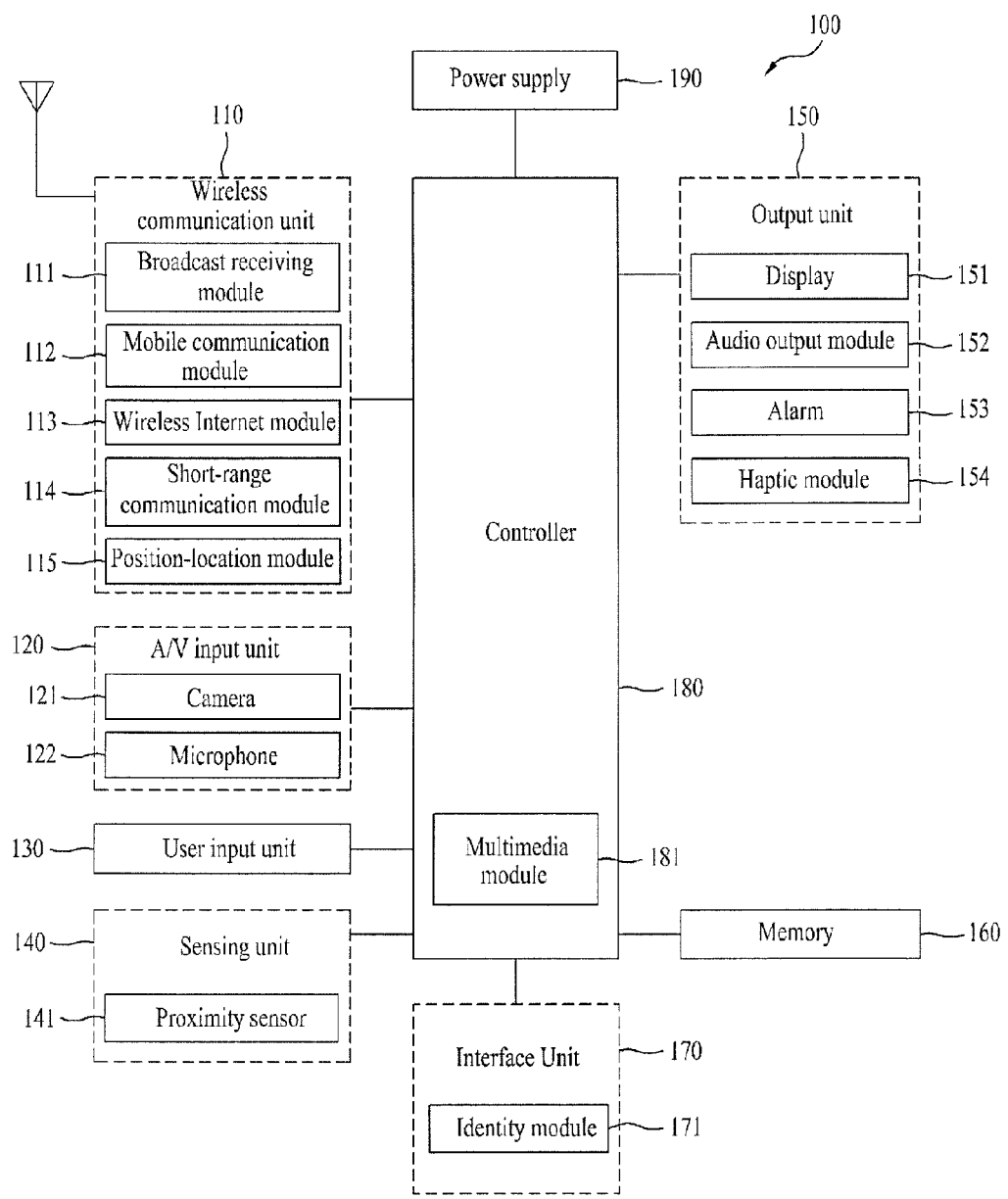
FIG. 1 is a block diagram of a mobile terminal of the present invention.

FIG. 1 is a block diagram of mobile terminal 100 in accordance with the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. More or fewer components may alternatively be implemented.

FIG. 1 shows a wireless communication unit 110 configured with several commonly implemented components. The wireless communication unit 110 typically includes one or more components that permit wireless communication between the mobile terminal 100 and a wireless communication system or network within which the mobile terminal is located. The wireless communication unit 110 may include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing entity via a broadcast channel. The broadcast channel may include a satellite channel and/or a terrestrial channel. The broadcast managing entity refers generally to a system that transmits a broadcast signal and/or broadcast associated information.

Examples of broadcast associated information include information associated with a broadcast channel, a broadcast program, and a broadcast service provider, to name a few. For example, broadcast associated information may include an electronic program guide (EPG) of digital multimedia broadcasting (DMB) and an electronic service guide (ESG) of digital video broadcast-handheld (DVB-H).

The broadcast signal may be implemented as a TV broadcast signal, a radio broadcast signal, and/or a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

Receiving of multicast signals is also possible. If desired, data received by the broadcast receiving module 111 may be stored in a suitable device, such as a memory 160.

The mobile communication module 112 transmits/receives wireless signals to/from one or more network entities (e.g., base station, Node-B). Such signals may represent audio, video, multimedia, control signaling, and data, to name a few.

The wireless Internet module 113 supports Internet access for the mobile terminal 100. The wireless Internet module may be internally or externally coupled to the mobile terminal 100.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth®, and ZigBee®, to name a few.

The position-location module 115 identifies or otherwise obtains the location of the mobile terminal 100. If desired, this module may be implemented using global positioning system (GPS) components that cooperate with associated satellites, network components, and combinations thereof The audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

The microphone 122 receives an external audio signal while the mobile terminal 100 is in a particular mode, such as phone call mode, recording mode and voice recognition. This audio signal is processed and converted into digital data. The mobile terminal 100, and in particular, A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones 122 and/or cameras 121 may be used.

A user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal 100. The sensing unit 140 may include a proximity sensor 141. For example, the sensing unit may detect an open/close status of the mobile terminal 100, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal.

As an example, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by a power supply 190 and the presence or absence of a coupling or other connection between an interface unit 170 and an external device.

The interface unit 170 is often implemented to couple the mobile terminal 100 with external devices. The interface unit 170 receives data from the external devices or is supplied with power and then transfers the data or power to respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, or an earphone port.

The interface unit 170 may include an identity module 171. The identity module 171 may be a chip for storing various types of information for authenticating a use authority of the mobile terminal 100 and may include a User Identify Module (UIM), a Subscriber Identify Module (SIM), or a Universal Subscriber Identity Module (USIM).

A device having the identity module 171 (hereinafter called 'identity device') may be manufactured as a smart card. Therefore, the identity device is connectible to the mobile terminal 100 via a corresponding port.

When the mobile terminal 100 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power may operate as a signal enabling the mobile terminal 100 to recognize that it is correctly loaded in the cradle.

The output unit 150 generally includes various components that support the output requirements of the mobile terminal 100. A display 151 is typically implemented to visually display information associated with the mobile terminal 100.

For example, if the mobile terminal 100 is operating in a phone call mode, the display 151 will generally provide a user interface or graphical user interface that includes information associated with placing, conducting, and terminating a phone call. As another example, if the mobile terminal 100 is in a video call mode or a photographing mode, the display 151 may additionally or alternatively display images that are associated with these modes.

One particular implementation includes the display 151 being configured as a touch screen that works in cooperation with an input device, such as a touchpad. This configuration permits the display 151 to function as both an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays 151. An example of a two-display embodiment is one in which one display 151 is configured as an internal display (viewable when the terminal is in an opened position) and a second display configured as an external display (viewable in both the open and closed positions).

FIG. 1 further shows output unit 150 having an audio output module 152 that supports the audio output requirements of the mobile terminal 100. The audio output module 152 is often implemented using one or more speakers, buzzers, other audio producing devices, and combinations thereof. The audio output module 152 functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal 100. Typical events include call received, message received and user input received. It is understood that the various outputs provided by the components of the output unit 150 may be separately performed, or such outputs may be performed using any combination of such components.

An example of such output includes the providing of tactile sensations (e.g., vibration) to a user. For example, the alarm 153 may be configured to vibrate responsive to the mobile terminal 100 receiving a call or message. As another example, vibration is provided by the alarm 153 responsive to receiving user input at the mobile terminal, 100 thus providing a tactile feedback mechanism.

The output unit 150 may also include a haptic module 154. The haptic module 154 generates various tactile effects that may be sensed by a user. Vibration represents one of the tactile effects generated by the haptic module 154. Strength and pattern of the vibration generated by the haptic module 154 are controllable. For example, different vibrations may be outputted in a manner of being synthesized together or may be outputted in sequence.

The haptic module 154 is able to generate other various tactile effects besides vibration. For example, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to the contact with an electrode, an effect attributed to electrostatic force, and an effect attributed to the representation of hold/cold sense using an endothermic or exothermic device, to name a few.

The haptic module 154 may be implemented to enable a user to sense the tactile effect through a muscle sense of finger or arm, as well as to transfer the tactile effect through a direct contact. Optionally, at least two haptic modules 154 may be provided to the mobile terminal 100 in accordance with the corresponding configuration type of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, pictures, and video, to name a few. The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The mobile terminal 100 also includes a controller 180. The controller 180 typically controls the overall operations of the mobile terminal. For example, the controller performs the control and processing associated with voice calls, data communications, video calls, camera operations and recording operations.

If desired, the controller may include a multimedia module 181 that provides multimedia playback. The multimedia module 181 may be configured as part of the controller 180 or may be implemented as a separate component.

The power supply 190 provides power required by the various components for the mobile terminal 100. The provided power may be internal power, external power, or combinations thereof Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in a memory, such as the memory 160, and executed by a controller or processor, such as the controller 180.

Figure 2:
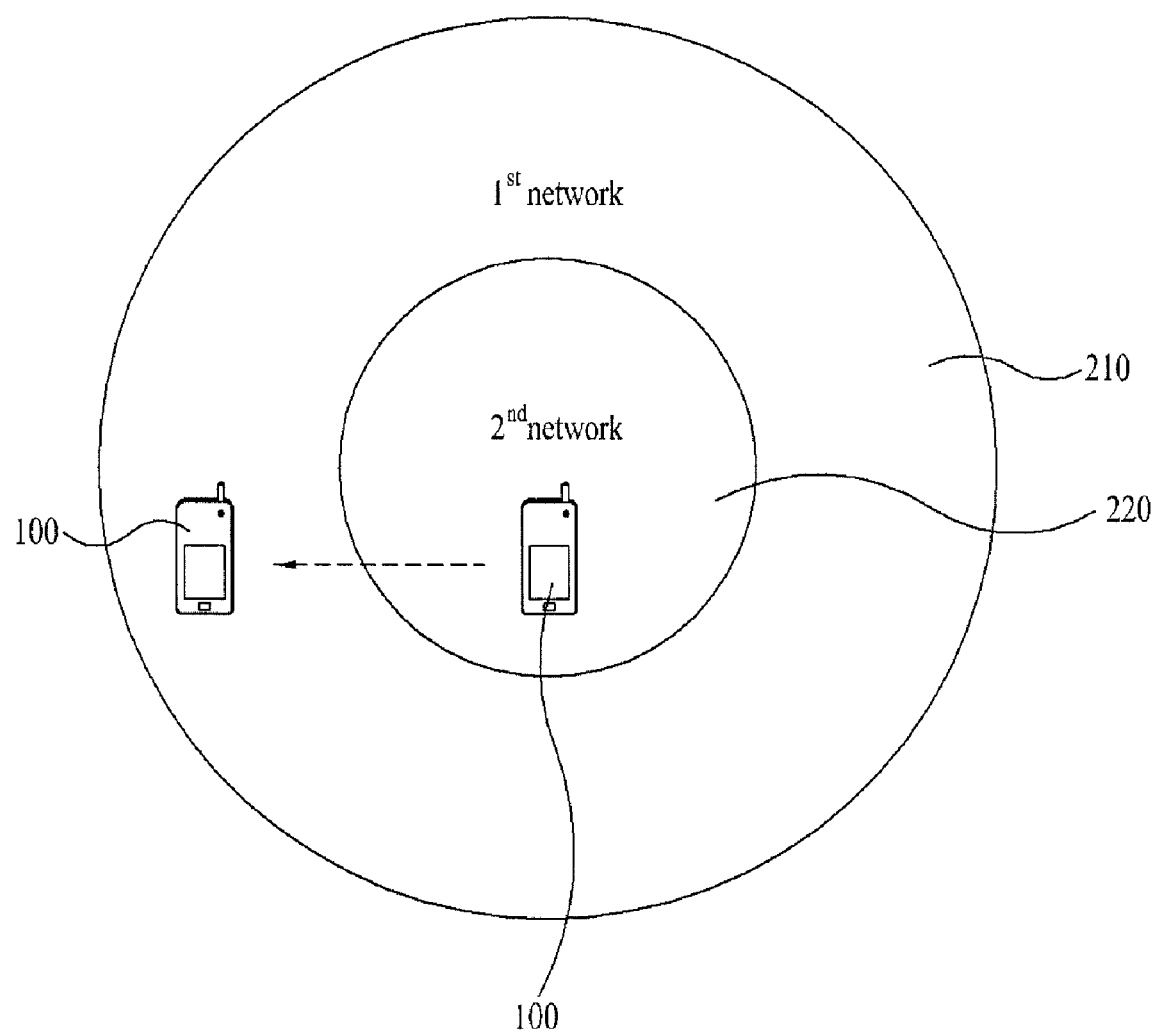
FIG. 2 is a diagram depicting a relation between a first network and a second network for implementation of the present invention.

Prior to the detailed description of the present invention, a network structure for applying a handover method according to the present invention is explained with reference to FIG. 2. FIG. 2 is a diagram depicting a relation between a first network and a second network for implementation of the present invention.

Referring to FIG. 2, the present invention applies where a plurality of networks, such as a first network 210 and a second network 220, having different types of network systems exist. For example, the first network 210 may be an eHRPD (evolved high rate packet data) network of 3GPP2 ($3^{rd}$ generation partnership project 2) and the second network 220 may be a LTE (long term evolution) network of 3GPP ($3^{rd}$ generation partnership project).

The first and second networks 210 and 220 may overlap such that they share an accessible area. In particular, the second network 220 is accessible to a portion of an area that may be accessed by the first network 210. For example, the second network 220 is able to exist as a hot spot within the area that may be accessed by the first network 210.

Each of the first and second networks 210 and 220 may include a network for providing Internet protocol (IP) based data communication service. This data communication may include one of voice communication using VoIP (voice Internet protocol), multimedia data communication of speech, still picture, and moving picture, to name a few.

The first and second networks 210 and 220 may share the same IP for the mobile terminal 100. Accordingly, if the mobile terminal 100 is moving within a sub-network to which the first and second networks 210 and 220 belong, the first and second networks 210 and 220 may keep the same IP.

Compared to the second network 220, the first network consumes relatively greater time for a registration procedure and has a relatively lower data communication speed (data rate). Therefore, according to the present invention, the time taken for a registration procedure to meet a handover request to the first network 210 may be saved by performing the registration procedure by accessing the first network 210 and then performing data communication by performing a handover to the second network 220.

The mobile terminal 100 performs a handover to the second network 220 after completion of a registration procedure with the first network 210. The mobile terminal 100 then performs a handover to the first network 210 from the second network 220 according to data communication sensitivity.

Figure 3:
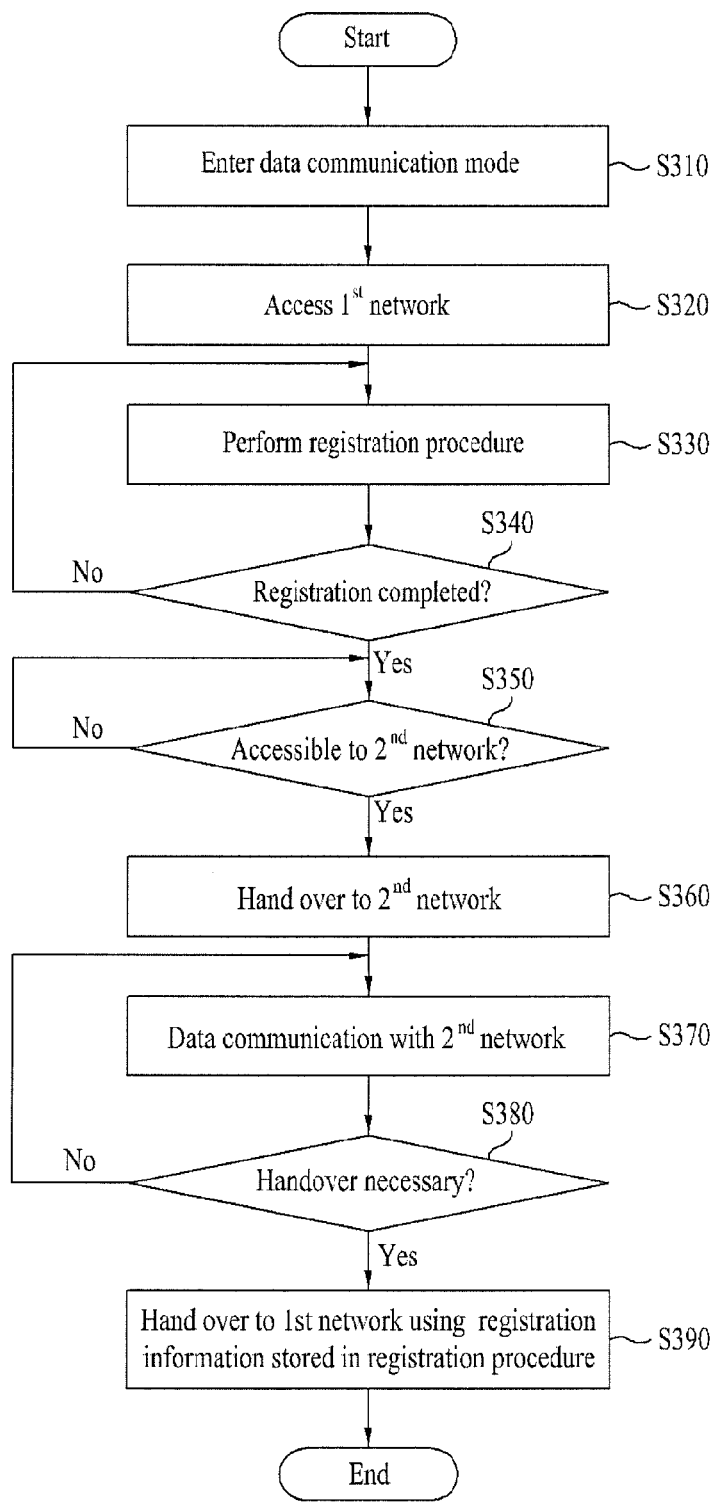
FIG. 3 is a flowchart of a handover method of a mobile terminal according to the present invention.

A handover method of a mobile terminal 100 according to the present invention is explained in detail with reference to FIG. 3. FIG. 3 is a flowchart of a handover method of a mobile terminal according to the present invention.

Referring to FIG. 3, if an input of a user action corresponding to a data communication mode entry command via the user input unit 130 is received, the mobile terminal 100 enters a data communication mode that corresponds to the input user action under the control of the controller 180 [S310]. The data communication mode may include one of a voice call transmission/reception mode using VoIP, a data (e.g., multimedia data) upload/download mode, and a real-time video play mode, to name a few.

If the data communication mode is entered, the controller 180 accesses a network and is then able to activate the wireless communication unit 110, which is a component for performing data communication. In particular, the mobile communication module 112 or the wireless Internet module 113 may perform the data communication with the accessed network.

First and second communication modules may be provided in the wireless communication unit 110 to perform the data communication with the first and second networks 210 and 220. If the first network 210 is accessed, the first communication module may be activated. If the second network 220 is accessed, the second communication module may be activated.

If the mobile terminal 100 enters the data communication mode, the mobile terminal 100 accesses the first network 210 via the wireless communication unit 110 under the control of the controller 180 [S320]. In this manner, if entry into the data communication mode is detected, the mobile terminal 100 preferentially accesses the first network 210.

If a user selects a priority access to the first network 210 via the user input unit 130 (before/after detection of entry into the data communication mode), the mobile terminal 100 is able to preferentially access the first network 210. This saves the time taken to perform a handover to the first network 210 from the second network 220 by performing the registration procedure by preferentially accessing the first network 210, which has a registration procedure execution time that is relatively greater than the registration procedure execution time of the second network 220.

The mobile terminal 100 performs the registration procedure with the first network 210 under the control of the controller 180 [S330]. The registration procedure executing process is explained in detail with reference to FIGS. 4 and 6 as follows.

Figure 4:
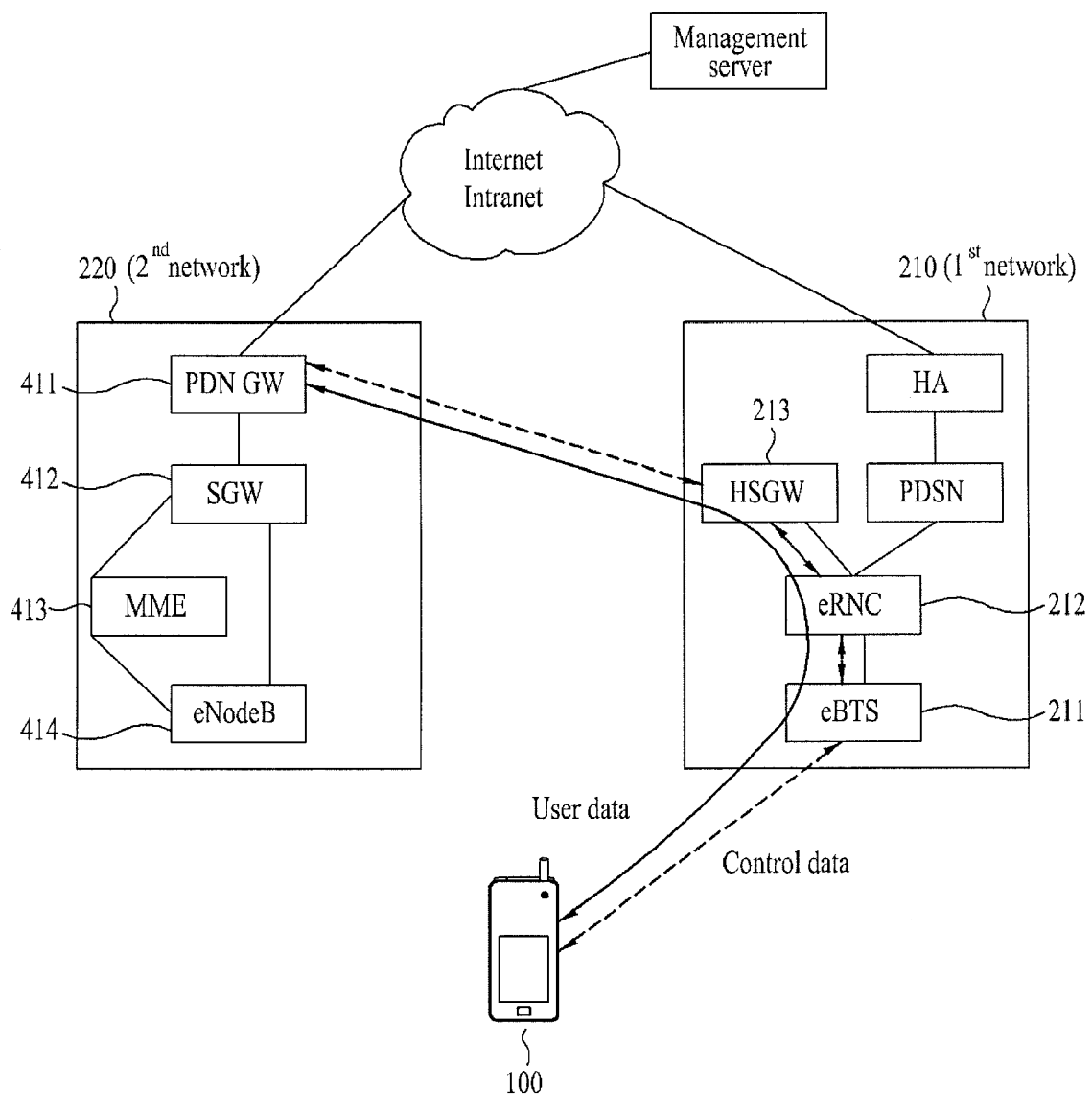
FIG. 4 is a block diagram of a system for a mobile terminal to perform a registration procedure or data communication by accessing a first network according to the present invention.

Referring to FIG. 4, the first network 210 includes an eBTS (evolved base transceiver station) 211, an eRNC (evolved radio network controller) 212 and an HSGW (HRPD serving gateway) 213 for examples of a base station, a network control server and a network gateway, respectively. The second network 220 includes a PDN GW (packet data network gateway) 411 of an LTE network of 3GPP2 for example of a network gateway.

The mobile terminal 100 accesses the first network 210 and is then able to send a message including its identification number (e.g., phone number) to the eBTS 211. The message including the identification number may be sent to the PDN GW 411 of the second network 220 via the eBTS 211, the eRNC 212 and the HSGW 213. Since as the second network 220 works as a core network, data and messages transceived between the first network 210 and the mobile terminal 100 pass through the PDN GW 411 of the second network 220.

Having received the message that includes the identification number, the PDN GW 411 receives authentication information matching the identification number of the mobile terminal 100 from an authenticating server and is then able to authenticate and register the mobile terminal 100. The registration information on the mobile terminal 100 may be stored in at least one of the eBTS 211, the eRNC 212, the HSGW 213 or the PDN GW 411. The registration information may include the identification number (e.g., phone number) of the mobile terminal 100 and authentication information (e.g., user information, authentication number, etc.) of the mobile terminal 100, to name a few.

A control path for connecting the mobile terminal 100 to the PDN GW 411 of the second network 220 via the eBTS 211, the eRNC 212 and the HSGW 213 may be established. As the mobile terminal 100 is successfully authenticated, the PDN GW 411 assigns an IP and is then able to send a message indicating the IP assignment to the mobile terminal 100 via the established control path.

Figure 6:
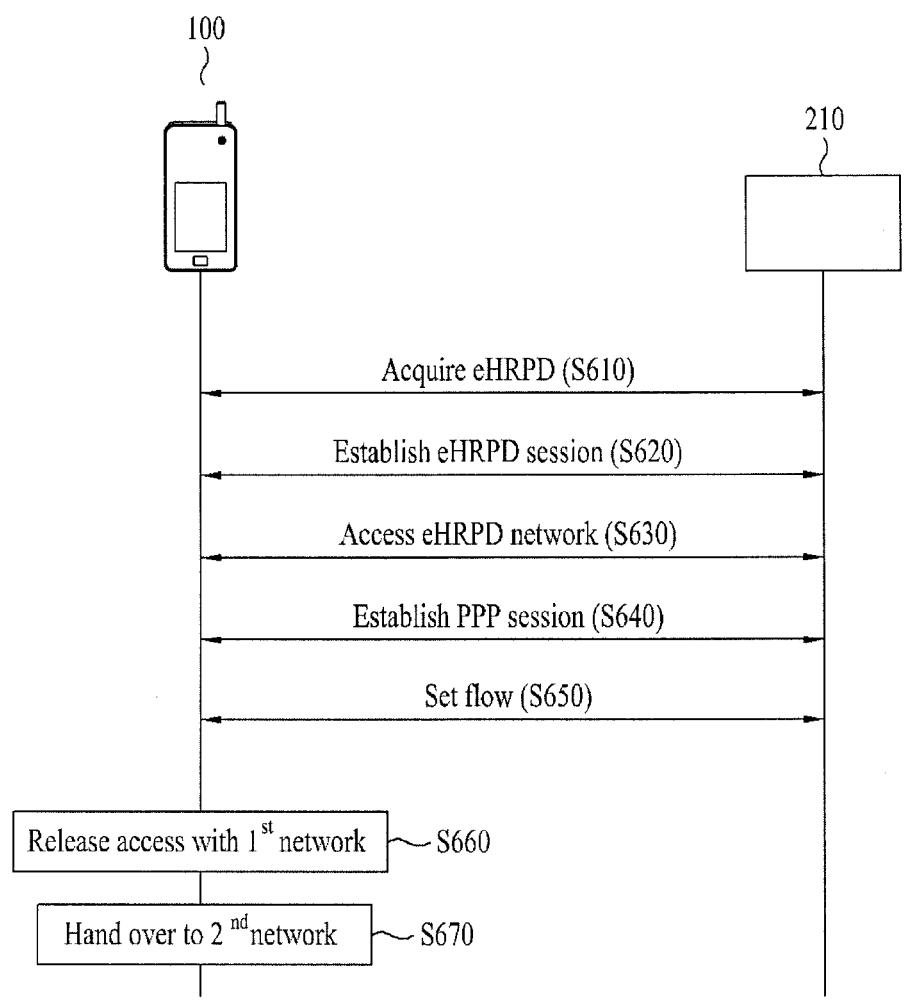
FIG. 6 is a flowchart of a process for a mobile terminal to perform a registration procedure on a first network according to the present invention.

FIG. 6 shows an access and session setting process between the mobile terminal 100 and the first network 210 for performing a registration procedure if the first network is the HRPD network of 3GPP. Referring to FIG. 6, the mobile terminal 100 acquires an eHRPD [S610] and then establishes an eHRPD session with an eHRPD network [S620]. As the eHRPD session is successfully established, the mobile terminal 100 is able to access the eHRPD network [S630]. The mobile terminal 100 establishes a PPP (point-to-point protocol) session with the eHRPD network [S640] and is then able to set up a flow for data stream transmission and reception [S650]. The mobile terminal 100 may then release access with the first network 210 [S660] and hand over to the second network 220 [S670].

As indicated in the foregoing description with reference to FIGS. 4 and 6, the mobile terminal 100 performs the registration procedure with the first network 210 and is able to have an IP assigned thereto in the course of the registration procedure. The assigned IP may include a proxy mobile IP (PMIP).

Referring again to FIG. 3, the mobile terminal 100 is able to check whether the registration procedure with the first network 210 is completed, under the control of the controller 180 [S340]. If the registration procedure is completed, the mobile terminal 100 is able to determine whether the second network 220 is accessible at a current location, under the control of the controller 180 [S350].

The mobile terminal 100 measures data communication sensitivity of both the first and second networks 210 and 220 at the current location via the wireless communication unit 110 and is then able to determine whether the data communication sensitivity of the second network 220 is equal to or greater than a predetermined reference. If the data communication sensitivity of the second network 220 is equal to or greater than the predetermined reference, the mobile terminal 100 is able to determine that it is accessible to the second network 220.

If it is determined that the mobile terminal 100 is accessible to the second network 220, the mobile terminal 100 is able to perform a handover to the second network 220 from the first network 210 via the wireless communication unit 110 under the control of the controller 180 [S360].

If the mobile terminal 100 determines to perform the handover to the second network 220, the mobile terminal 100 may release a connection between the mobile terminal 100 and the base station (e.g., the eBTS 211) in the control path connected to the first network 210 and is then able to perform the handover to the second network 220. This state may be referred to as a "dormant state." Meanwhile, the control path established between the base station (e.g., the eBTS 211) and the network gateway (e.g., the packet data network gateway 411) of the second network 220 may be maintained and not released.

The registration information stored on the first network 210 in the previous registration procedure may be stored in the network gateway (e.g., the HRPD serving gateway 213) for a predetermined time. Since the first and second networks 210 and 220 share the IP assigned in the course of the registration procedure with the first network 210, the mobile terminal 100 does not need to have the IP assigned thereto when completing the handover to the second network 220. If the mobile terminal 100 is performing a handover to the second network 220, the mobile terminal 100 is able to transceive data with the second network 220 via the wireless communication unit 110 under the control of the controller 180 [S370].

Figure 5:
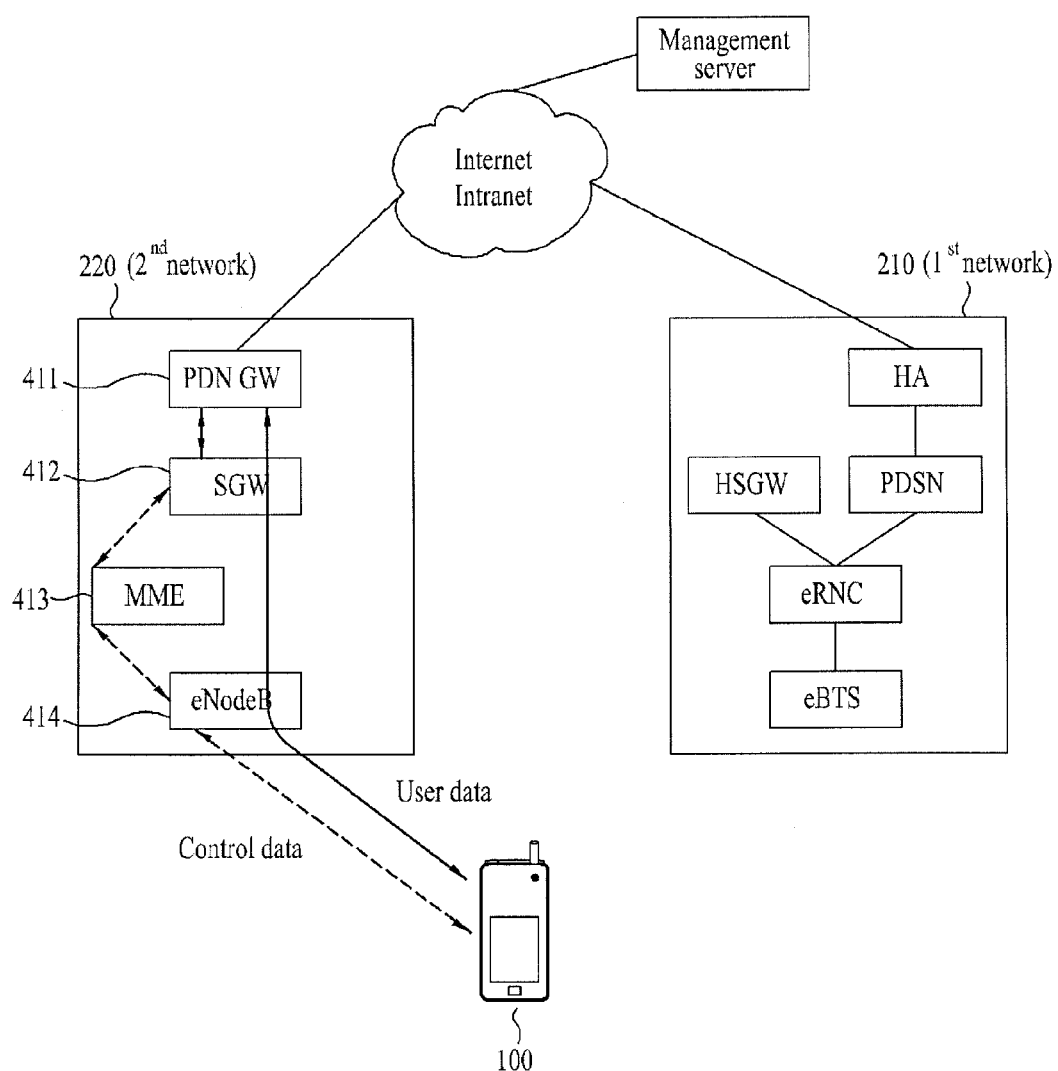
FIG. 5 is a block diagram of a system for a mobile terminal to perform a data communication by accessing a second network according to the present invention.

A data communication process between the mobile terminal 100 and the second network 220 is explained with reference to FIG. 5. The mobile terminal 100 accesses the second network 220 and is then able to transmit/receive user data with the second network 220 via a base station (e.g., eNodeB 414), a serving gate (e.g., serving gateway 412), and a network gateway (e.g., PDN GW 411), in order. The mobile terminal 100 is also able to transmit/receive control data with the second network 220 via the base station (e.g., eNodeB 414), a mobility control server (e.g., mobility management entity (MME) 413), the serving gateway (e.g., serving gateway (SGW) 412, and the network gateway (e.g., PDN GW 411), in order.

In the following description, a data communication, which is performed when a priority access to the first network 210 according to a user selection is made after a data communication mode entry, is explained in detail with reference to FIGS. 7 to 8B. For clarity and convenience of description only, the data communication is limited to a call transmission by VoIP.

Figure 7:
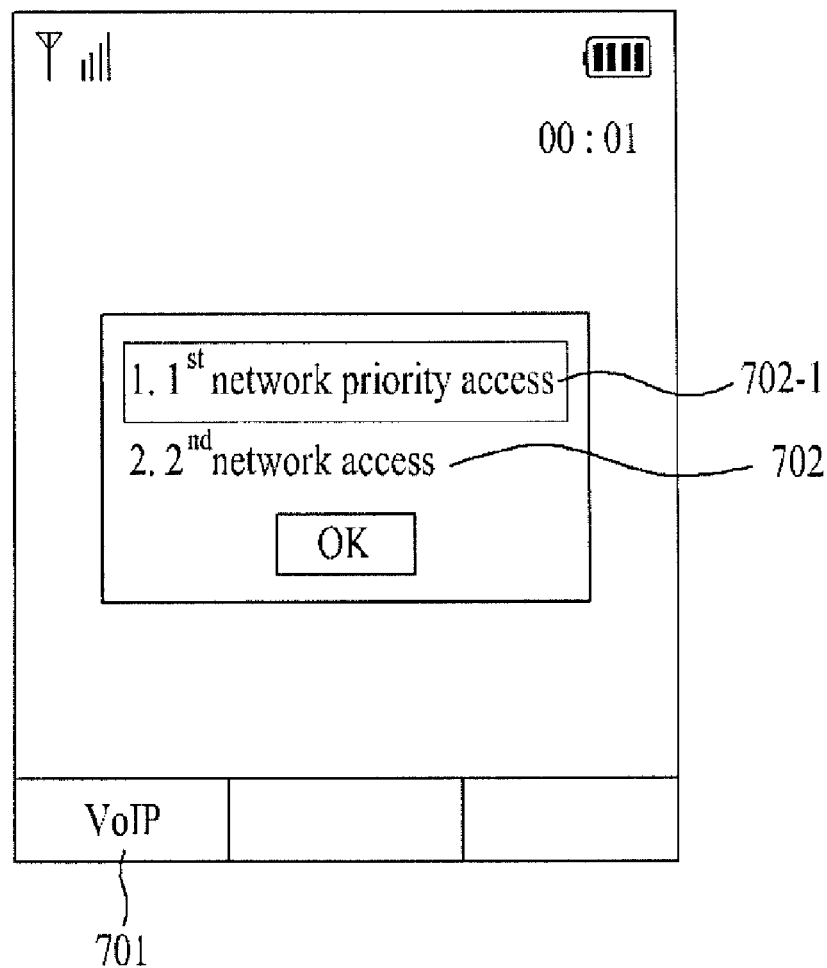
FIG. 7 is a diagram of a screen for explaining data communication in a first network.
Figure 8A:
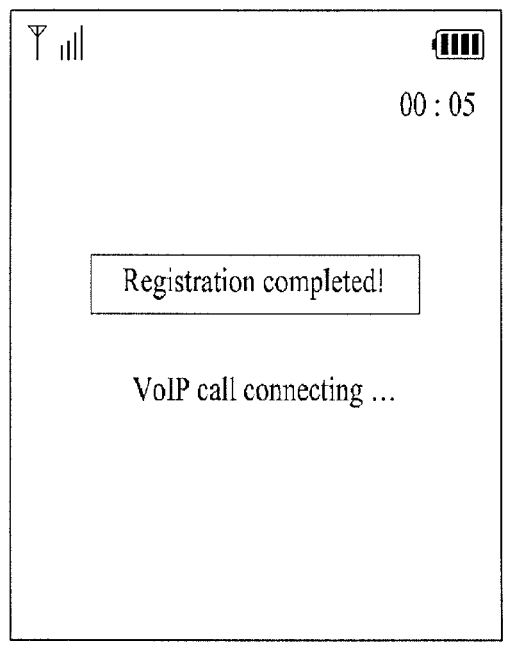
FIGS. 8A and 8B are diagrams of a screen for explaining data communication in a first network.
Figure 8B:
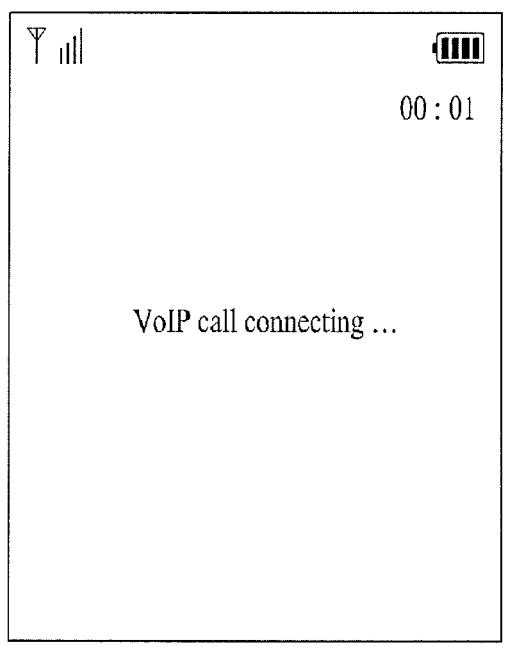

If a user selects a call transmission by VoIP by activating a "VoIP" region 701, the mobile terminal 100 outputs text for enabling the user to select a priority access to the first network 210 [FIG. 7]. If a priority access 702-1 to the first network 210 is selected in FIG. 7, the mobile terminal 100 is able to transmit a VoIP call to another terminal by accessing the second network 220 after completion of the registration procedure with the first network 210 [FIG. 8A]. If an access 702 to the second network 220 is selected in FIG. 7, the mobile terminal 100 is able to transmit a VoIP call to another terminal by directly accessing the second network 220 without executing the registration procedure with the first network 210 [FIG. 8B].

Referring again to FIG. 3, the mobile terminal 100 determines whether a handover to the first network 210 is necessary, under the control of the controller 180 [S380]. The mobile terminal 100 periodically or randomly measures the data communication sensitivities (hereinafter named a first sensitivity and a second sensitivity, respectively) of the first and second networks 210 and 220 via the wireless communication unit 110. When the second sensitivity is degraded below the predetermined reference, and the first sensitivity is recognized as having enough strength to maintain the data communication, the mobile terminal 100 is able to determine that handover to the first network 210 is necessary.

The mobile terminal 100 may also determine that handover to the first network 210 is necessary if it determines that it is in a boundary cell. Here, the boundary cell refers to a position within the first network 210 that is located on a boundary of the second network 220.

If the mobile terminal 100 is located in the boundary cell, it is highly possible that the mobile terminal 100 is moving away from an area of the second network 220 into an area of the first network 210. Information indicating whether the mobile terminal 100 is located in the boundary cell may be provided from the network gateway (e.g., PDN GW 411) of the second network 220 or may be determined using the position location module 115 within the mobile terminal 100.

If the mobile terminal 100 determines that handover to the first network 210 is necessary, the mobile terminal 100 may attempt to maintain the registration information (explained in the above description), as previously stored, in the first network 210. If the mobile terminal 100 is configured to delete the registration information previously stored in the first network 210 after expiration of a specific time period, the mobile terminal 100 may enable the registration information to be maintained in the first network by performing a handover to the first network 210 at a random timing point prior to the expiration of the specific time period.

If the mobile terminal 100 performs the handover to the first network 210 in order to maintain the registration information (as explained above) stored previously in the first network 210, the mobile terminal 100 is able to perform a handover to the second network 220 again within a predetermined period of time. The mobile terminal 100 and the second network 220 may periodically repeat an active state (or data communication available state) and an inactive state (or data communication unavailable state or idle state).

The predetermined period of time may include an arbitrary period in the inactive state where the second network 220 is unavailable for substantial data communication with the mobile terminal 100. In this manner, the mobile terminal 100 temporarily hands over to the first network in order to maintain the registration information previously stored in the first network 210.

If it is determined that handover to the first network 210 is necessary, the mobile terminal 100 is able to perform a handover to the first network 210 using the registration information previously stored in the first network 210 in the previous registration procedure via the wireless communication unit 110 under the control of the controller 180 [S390]. Since it is unnecessary to perform the registration procedure when performing the handover, which saves the corresponding time consumption, the mobile terminal 100 may perform seamless communication with the first network 210 to exchange data carried in the course of the communication with the second network 220.

Figure 9:
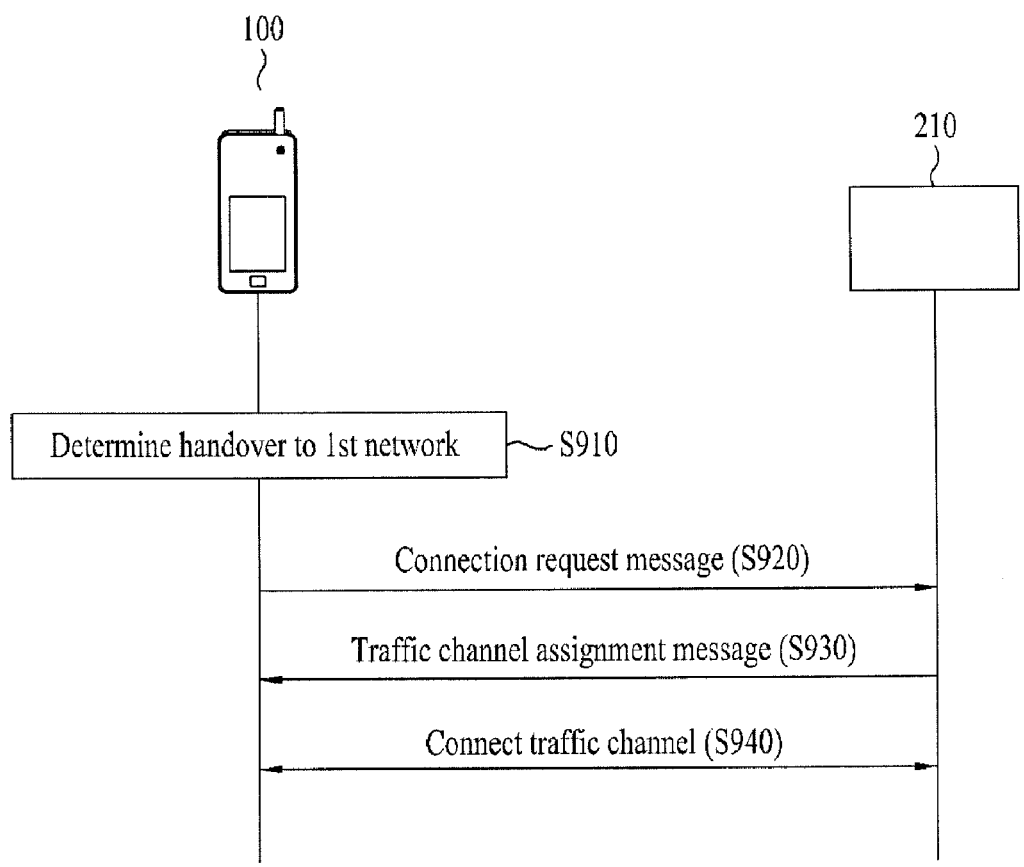
FIG. 9 is a flowchart of a process for a mobile terminal to access a first network when performing a handover to the first network from a second network according to the present invention.

The handover is explained in detail with reference to FIG. 9 as follows. If the mobile terminal 100 determines to perform a handover to the first network [S910], the mobile terminal 100 sends a connection request message to the first network 210 [S920]. Subsequently, the mobile terminal 100 receives a traffic channel assignment message from the first network 210 [S930] and is then able to connect a traffic channel with the first network 210 [S940]. Accordingly, the mobile terminal 100 is able to perform data communication with the first network 210 via the connected traffic channel.

The present invention provides the several effects and/or advantages. After a registration procedure with a first network has been preferentially performed, a handover is performed to a second network. Therefore, it is unnecessary to perform a registration procedure when performing a handover back to the first network from the second network. When a handover is performed from the second network to a first network, with which a registration procedure was previously performed, it is unnecessary to perform the registration procedure again. Therefore, the present invention is able to seamlessly maintain a data communication in progress.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal, comprising:
  a wireless communication unit configured to transmit and receive data via at least one network; and
  a controller configured to access a first network of the at least one network, perform a registration procedure by storing information in the first network, and control the wireless communication unit to perform a first handover from the first network to a second network of the at least one network upon completion of the registration procedure in order to perform data communication by accessing the second network,
  wherein the controller is further configured to determine if a second handover from the second network back to the first network is necessary while the mobile terminal accesses the second network, and
  wherein the controller is further configured to control the wireless communication unit to perform the second handover from the second network to the first network using the registration information stored in the first network when the controller determines that the second handover from the second network back to the first network is necessary.

2. The mobile terminal of claim 1, wherein the first network is a different type of network than the second network.

3. The mobile terminal of claim 1, wherein at least a portion of the second network is accessible in an area in which the first network is accessible.

4. The mobile terminal of claim 1, wherein the wireless communication unit is further configured to receive an assignment of an Internet protocol (IP) during the registration procedure.

5. The mobile terminal of claim 4, wherein the first network and the second network share the IP assigned during the registration procedure.

6. The mobile terminal of claim 1, further comprising a user input unit configured to select a priority access to the first network,
  wherein the controller is further configured to perform the registration procedure upon selection of the priority access to the first network.

7. The mobile terminal of claim 1, wherein the controller is further configured to determine that the second handover from the second network back to the first network is necessary when data communication sensitivity with the second network is less than a predetermined reference or when the mobile terminal is located in a boundary cell.

8. The mobile terminal of claim 1, wherein the controller is further configured to:
  delete the registration information previously stored in the first network after expiration of a specific period of time, the registration information stored in the first network being maintainable in the first network by performing a third handover from the second network to the first network prior to the expiration of the specific time period;
  determine that the third handover from the second network back to the first network is necessary when the controller intends to maintain the registration information stored in the first network; and
  control the wireless communication unit to perform a fourth handover from the first network back to the second network within a predetermined time after the third handover from the second network to the first network in order to maintain the registration information in the first network.

9. The mobile terminal of claim 8, wherein the controller is further configured to set the predetermined time within an idle time of data communication with the second network prior to the third handover from the second network to the first network.

10. The mobile terminal of claim 1, wherein the wireless communication unit is further configured to transmit and receive data between the second network and the first network when the second handover from the second network to the first network is made during the data communication with the second network.

11. A method of performing a handover of a mobile terminal, the method comprising:
- accessing a first network of at least one network;
- performing a registration procedure via a controller;
- storing registration information in the first network;
- performing a first handover via a wireless communication unit from the first network to a second network of the at least one network upon completion of the registration procedure in order to perform data communication by accessing the second network;
- determining via the controller if a second handover from the second network back to the first network is necessary while accessing the second network; and
- controlling the wireless communication unit via the controller to perform the second handover from the second network to the first network using the registration information stored in the first network when it is determined that second the handover from the second network back to the first network is necessary.

12. The method of claim 11, wherein the first network is a different type of network than the second network.

13. The method of claim 11, wherein at least a portion of the second network is accessible in an area in which the first network is accessible.

14. The method of claim 11, further comprising assigning an Internet protocol (IP) during the registration procedure.

15. The method of claim 14, wherein the first network and the second network share the IP assigned during the registration procedure.

16. The method of claim 11, further comprising:
- selecting a priority access to the first network via a user input unit,
- wherein the registration procedure is performed upon selection of the priority access to the first network.

17. The method of claim 11, further comprising determining via the controller that the second handover from the second network back to the first network is necessary when data communication sensitivity with the second network is less than a predetermined reference or when the mobile terminal is located in a boundary cell.

18. The method of claim 11, wherein the controller is configured to delete the registration information previously stored in the first network after expiration of a specific period of time and the registration information stored in the first network is maintainable in the first network by performing a third handover from the second network to the first network prior to the expiration of the specific period of time, the method further comprising:
- determining via the controller that the third handover from the second network back to the first network is necessary when the controller intends to maintain the registration information stored in the first network; and
- performing a fourth handover from the first network back to the second network via the wireless communication unit within a predetermined time after the third handover from the second network to the first network in order to maintain the registration information in the first network.

19. The method of claim 18, further comprising setting the predetermined time, via the controller, within an idle time of data communication with the second network prior to the third handover from the second network to the first network.

20. The method of claim 11, further comprising transmitting and receiving data between the second network and the first network via the wireless communication unit when the second handover from the second network to the first network is performed during the data communication with the second network.

* * * * *